US008776195B1

(12) United States Patent
Avni et al.

(10) Patent No.: US 8,776,195 B1
(45) Date of Patent: Jul. 8, 2014

(54) COMMON DATA FORMAT IN KNOWLEDGE-BASED AUTHENTICATION

(75) Inventors: Ayelet Avni, Binyamina (IL); Bryan Knauss, Broadlands, VA (US); Yedidya Dotan, Tel Aviv (IL); Erez Yakoel, Kidron (IL)

(73) Assignee: EMC Corporation, Hopkinton, MA (US)

(*) Notice: Subject to any disclaimer, the term of this patent is extended or adjusted under 35 U.S.C. 154(b) by 4 days.

(21) Appl. No.: 13/434,993

(22) Filed: Mar. 30, 2012

(51) Int. Cl.
G06F 7/04 (2006.01)
G06F 21/30 (2013.01)

(52) U.S. Cl.
CPC ..................... G06F 21/30 (2013.01)
USPC ........ 726/6; 726/5; 726/2; 707/705; 707/634; 713/171; 713/168; 713/189; 713/300

(58) Field of Classification Search
CPC ........ H04W 12/06; G06F 21/30; G06F 21/31; H04L 9/0813
USPC ............ 726/5–6, 3, 26, 2; 713/180–182, 185, 713/171, 166; 705/325; 707/705, 205
See application file for complete search history.

(56) References Cited

U.S. PATENT DOCUMENTS

| 7,260,724 | B1 * | 8/2007 | Dickinson et al. ............ 713/182 |
| 7,707,621 | B2 * | 4/2010 | Walmsley .......................... 726/2 |
| 7,739,733 | B2 * | 6/2010 | Szydlo ............................. 726/17 |
| 7,748,029 | B2 * | 6/2010 | Ross .................................. 726/6 |
| 7,941,661 | B2 * | 5/2011 | Walmsley et al. ............ 713/166 |
| 8,316,237 | B1 * | 11/2012 | Felsher et al. ................ 713/171 |
| 2004/0181753 | A1 * | 9/2004 | Michaelides .................. 715/523 |
| 2009/0077002 | A1 * | 3/2009 | Clark et al. ..................... 706/59 |
| 2009/0305670 | A1 * | 12/2009 | DeBoer et al. ................ 455/411 |
| 2009/0328175 | A1 * | 12/2009 | Shuster ............................ 726/7 |
| 2010/0250955 | A1 * | 9/2010 | Trevithick et al. ............ 713/185 |
| 2010/0293608 | A1 * | 11/2010 | Schechter et al. ................ 726/8 |
| 2012/0191621 | A1 * | 7/2012 | Williams et al. .............. 705/325 |
| 2013/0073473 | A1 * | 3/2013 | Heath ............................ 705/319 |

* cited by examiner

Primary Examiner — Cordelia Zecher
Assistant Examiner — Viral Lakhia
(74) Attorney, Agent, or Firm — BainwoodHuang

(57) ABSTRACT

An improved technique involves converting facts from multiple fact sources to a common data format. Along these lines, for each fact source having a source-specific format, a KBA system provides an adaptor that converts incoming facts in the source-specific format to the common data format prior to generating questions. The KBA system stores the facts in the common format in a database for subsequent access. In response to an authorization request, the KBA system then builds questions based on the facts from multiple sources in the common data format stored in the database.

16 Claims, 6 Drawing Sheets

COMMON DATA FORMAT IN KNOWLEDGE-BASED AUTHENTICATION

BACKGROUND

In knowledge-based authentication (KBA), an organization questions a user for particular personal information. Such questions may include "when were you married?", "what was the make and model of your first car?", and "what was the name of your first pet?". The user must answer the question correctly in order to prove to the organization that he or she is not an imposter.

A conventional KBA service provider forms the questions that an organization presents to users from data acquired through an information source. Examples of a suitable information source include credit bureaus, public records, and corporate data. The conventional KBA service provider forms a set of questions from a suitable information source.

Along these lines, suppose that a conventional KBA service provider retrieves emails from a Microsoft Exchange® server. When an organization wishes to authenticate a user within the organization, the KBA system retrieves an email to the user discussing a meeting with another person at a particular time and place. The KBA system forms questions from data in the email (e.g., "With whom did you meet in Conference Room A at 10 AM last Thursday?").

SUMMARY

Unfortunately, there are deficiencies with the above-described conventional KBA service providers. For example, a conventional KBA service provider forms questions from each information source independently from the other information sources. A reason for this lies in the fact that data formats used by different information sources tend to be incompatible.

A consequence of this data format incompatibility is that questions provided by conventional KBA service providers may be limited in scope or have contradictory answers. Along these lines, suppose that a conventional KBA service provider retrieves, for a corporate organization, emails from a Microsoft Exchange® server. When the organization wishes to authenticate a first person within the organization, the KBA system retrieves an email to the first person discussing a dinner meeting with a second person at a particular time and place. Sometime later, the KBA system retrieves an expense report from an SAP database detailing a dinner meeting involving the first person, the second person, and a third person outside of the organization; the dinner meeting is at the particular time specified in the email, but happens at a different place (e.g., the participants changes their minds at the last minute). An answer to a question regarding the dinner meeting may be right or wrong, depending on whether the question was derived from the email or the expense report.

One workaround to such a problem may be to apply post-processing operations on sets of questions to find contradictory information such as that described above. A difficulty with this workaround, however, is that program logic for the post-processing operations can become excessively complicated. Such complexity would inhibit conventional KBA service providers from generating questions to a person directly in response to an authentication request.

In addition, it is very difficult to integrate new information sources into a conventional KBA service provider. It is not uncommon for such an integration project to consume a year of effort, even in a simple case such as replacing one information source with another having the same data, but in different formats. The difficulty stems in adapting the question building logic to different platforms; immense effort is required in identifying data structures from and adapting name resolution and internationalization to the new source.

In contrast to conventional systems conventional KBA service providers in which it is difficult to form a robust set of questions from multiple information sources, an improved technique involves converting facts from multiple fact sources to a common data format. Along these lines, for each fact source having a source-specific format, a KBA system provides an adaptor that converts incoming facts in the source-specific format to the common data format prior to generating questions. The KBA system stores the facts in the common format in a database for subsequent access. In response to an authorization request, the KBA system then builds questions based on the facts from multiple sources in the common data format stored in the database.

Advantageously, the improved technique allows for the KBA system to provide more robust questions to a user requesting authorization. A reason for this is that facts from all fact sources are presented together in the same format, as entries in a database. It is simpler for the KBA system to apply logical rules in the question building process to deal with contradictions between two sources of data than it is to determine which of a set of contradicting questions to present to the user.

Further, the individual fact sources do not need to be integrated into the complex logic of the question builder. The adaptors provided by the KBA system of the improved technique are lightweight, only containing logic and hardware needed to convert facts from the fact sources to the common format for storage in a database. Accordingly, integrating a new source into the KBA system takes relatively little time.

One embodiment of the improved technique is directed to a method of providing a set of questions in a KBA system. The method includes receiving facts from multiple fact sources, each fact source being associated with a distinct data format. The method also includes providing a set of adaptors, each adaptor being constructed and arranged to convert facts in a distinct data format with which a fact source is associated to a common data format. The method further includes generating the set of questions from the facts in the common data format, the set of questions being configured to elicit, from a user, a corresponding set of responses from which a KBA result is produced.

Additionally, some embodiments of the improved technique are directed to a system configured to provide a set of questions in a KBA system. The system includes a set of adaptors and a database server. Each adaptor of the set of adaptors includes a network interface, memory, and a controller, the controller being configured to receive facts from multiple fact sources, each fact source being associated with a distinct data format and convert the facts in a distinct data format with which a fact source is associated to a common data format. The database server includes a network interface, memory, and a controller, the controller being configured to generate the set of questions from the facts in the common data format, the set of questions being configured to elicit, from a user, a corresponding set of responses from which a KBA result is produced.

Furthermore, some embodiments of the improved technique are directed to a computer program product having a non-transitory computer readable storage medium which stores code including a set of instructions to carry the method of providing a set of questions in a KBA system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves converting facts from multiple fact sources to a common data format. Along these lines, for each fact source having a source-specific format, a KBA system provides an adaptor that converts incoming facts in the source-specific format to the common data format prior to generating questions. The KBA system stores the facts in the common format in a database for subsequent access. In response to an authorization request, the KBA system then builds questions based on the facts from multiple sources in the common data format stored in the database.

Advantageously, the improved technique allows for the KBA system to provide more robust questions to a user requesting authorization. A reason for this is that facts from all fact sources are presented together in the same format, as entries in a database. It is simpler for the KBA system to apply logical rules in the question building process to deal with contradictions between two sources of data than it is to determine which of a set of contradicting questions to present to the user.

Figure 1:
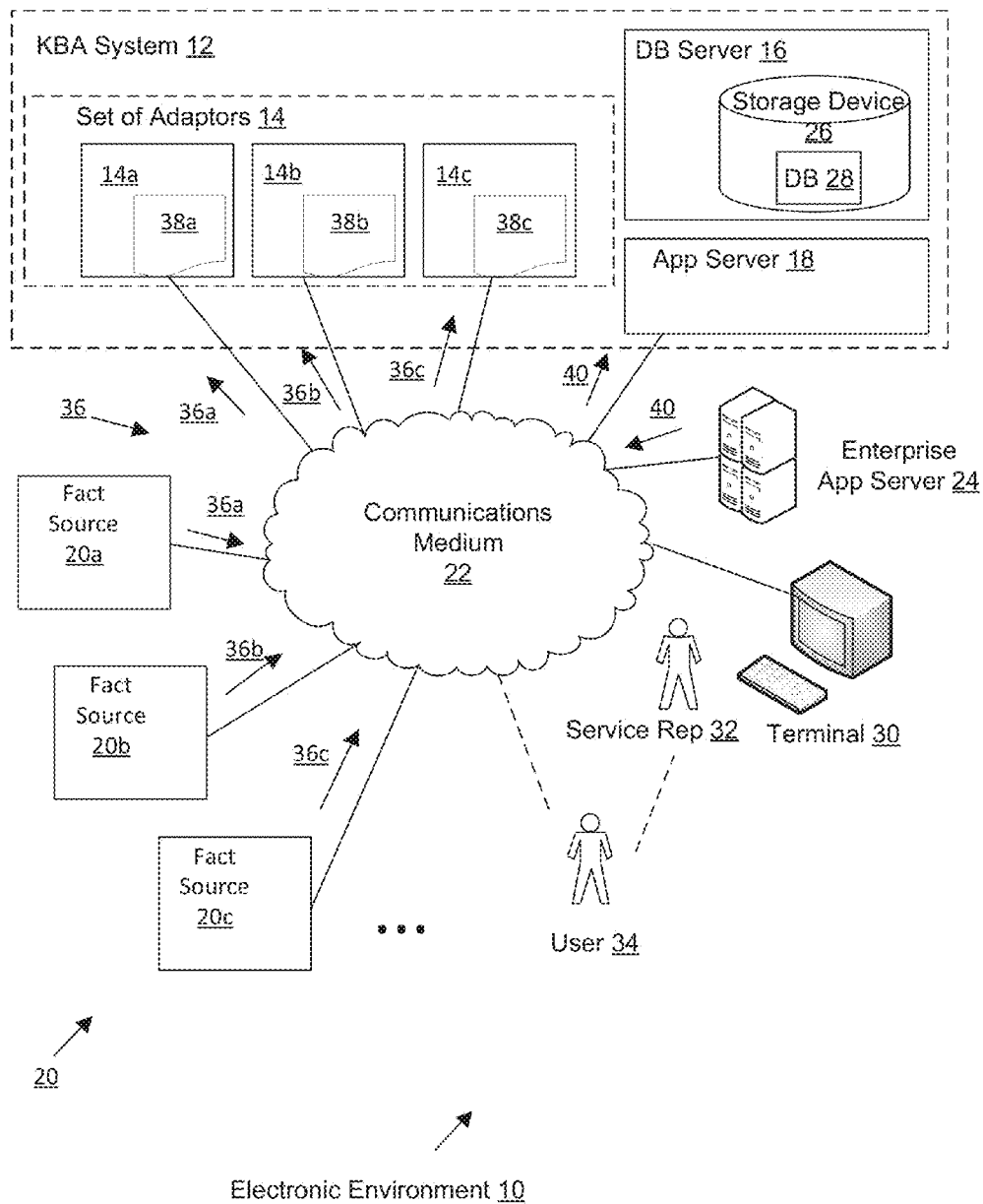
FIG. 1 is a block diagram illustrating an example electronic environment for carrying out the improved technique.

FIG. 1 illustrates an electronic environment 10 for carrying out the improved technique. Electronic environment 10 includes KBA system 12, fact sources 20, and communications medium 22.

Communication medium 22 provides network connections between KBA system 12 and fact sources 20. Communications medium 22 may implement a variety of protocols such as TCP/IP, UDP, ATM, Ethernet, Fibre Channel, combinations thereof, and the like. Furthermore, communications media 22 may include various components (e.g., cables, switches/routers, gateways/bridges, NAS/SAN appliances/nodes, interfaces, etc.). Moreover, the communications medium 22 are capable of having a variety of topologies (e.g., queue manager-and-spoke, ring, backbone, multi drop, point to-point, irregular, combinations thereof, and so on).

Fact sources 20 include various databases 20a, 20b, 20c, . . . , in communication with KBA system 12. For example, suppose that fact source 20a is a Microsoft Exchange® server, fact source 20b is an IBM Lotus Domino® server, and fact source 20c is an SAP server. In some arrangements, some or all of fact sources 20 are remote from KBA server 12; in other arrangements, some or all of fact sources 20 are in the same location as KBA server 12.

KBA system 12 includes a set of adaptors 14, a database server 16, and an application server 18.

Application server 18 is an electronic system in communication with database server 16 and external systems such as enterprise app server 24 that provide an application programming interface (API) for providing questions to user 34. Application server 18 may also be in communication with a NetView terminal 30 at which a service representative 32 provides questions to user 34.

Database server 16 is an electronic system in communication with the set of adaptors 14 and application server 18. Database server 16 includes storage device 26 on which database 28 is stored.

Database 28 is a database which stores facts in a common format. Database 28 includes entries, each of which represents a fact. The common format is represented by various fields within each entry. In some arrangements, database 28 is a relational database; in other arrangements, database 28 is a NoSQL database.

Set of adaptors 14 includes adaptors 14a, 14b, 14c, . . . (adaptors 14), for corresponding fact sources 20a, 20b, 20c, . . . . In some arrangements, adaptors 14 take the form of specialized hardware connected to database server 16. In other arrangements, adaptors 14 take the form of software configured to run on database server 16. In still other arrangements, adaptors 14 take the form of hardware or software connected to corresponding fact sources 20.

In the examples provided below, fact source 20a is a Microsoft Exchange® server, fact source 20b is an IBM Lotus Domino® server, and fact source 20c is a SAP server. In these cases, facts 36a are contained in emails, facts 36b are contained in calendar entries, and facts 36c are contained in expense reports. The facts 36a, 36b, and 36c each possess formatting defined by their respective fact source. For example, facts 36a are formatted according to the email formatting (e.g., MIME, plain type, HTML, etc.), facts 36b are formatted according to conventions used by Lotus Notes® for storing calendar data, and facts 36c are formatted according to how SAP treats expense report data.

During operation, fact sources 20 send facts 36 to adaptors 14 provided by KBA system 12. In some arrangements, fact sources 20 send facts 36 to KBA system 12 on a regular basis as part of a subscription. In other arrangements, fact sources 20 send facts 36 to KBA system 12 in response to a request sent by KBA server 12.

Each adaptor 14 receives facts 36 from a corresponding fact source and, upon receipt of the facts, converts the received facts from fact sources 20 in their respective formats into a common format. The common format is configured to allow KBA system 12 to store all facts 36 together in database 28, independent of the fact source 20 from where the facts 36 originated. Further details of the common format will be described below with respect to FIG. 3.

In performing a conversion operation, each adaptor 14 scans for data such as keywords, quantities, and identifiers within the individual format. Such key data represents values to be stored in an individual entry of database 28 representing a fact 36. In some arrangements, the conversion operation runs on a continuous basis; in other arrangements, the conversion operation runs off-line (e.g., during certain hours of the night when the servers are off-line).

In response to a request 40 to authorize a user 30 received at application server 18 from either service representative 32 or enterprise app server 24, database server 16 proceeds to build questions using the facts stored in database 28. Database server 16 performs a lookup operation on database 28 to find entries having a user identifier corresponding to user 34. From such entries, database server 16 constructs questions using the various fields in the entries which are defined by the common format.

Further details about the conversion and question building processes are discussed below with respect to FIGS. 2a, 2b, 3, and 4.

Figure 2A:
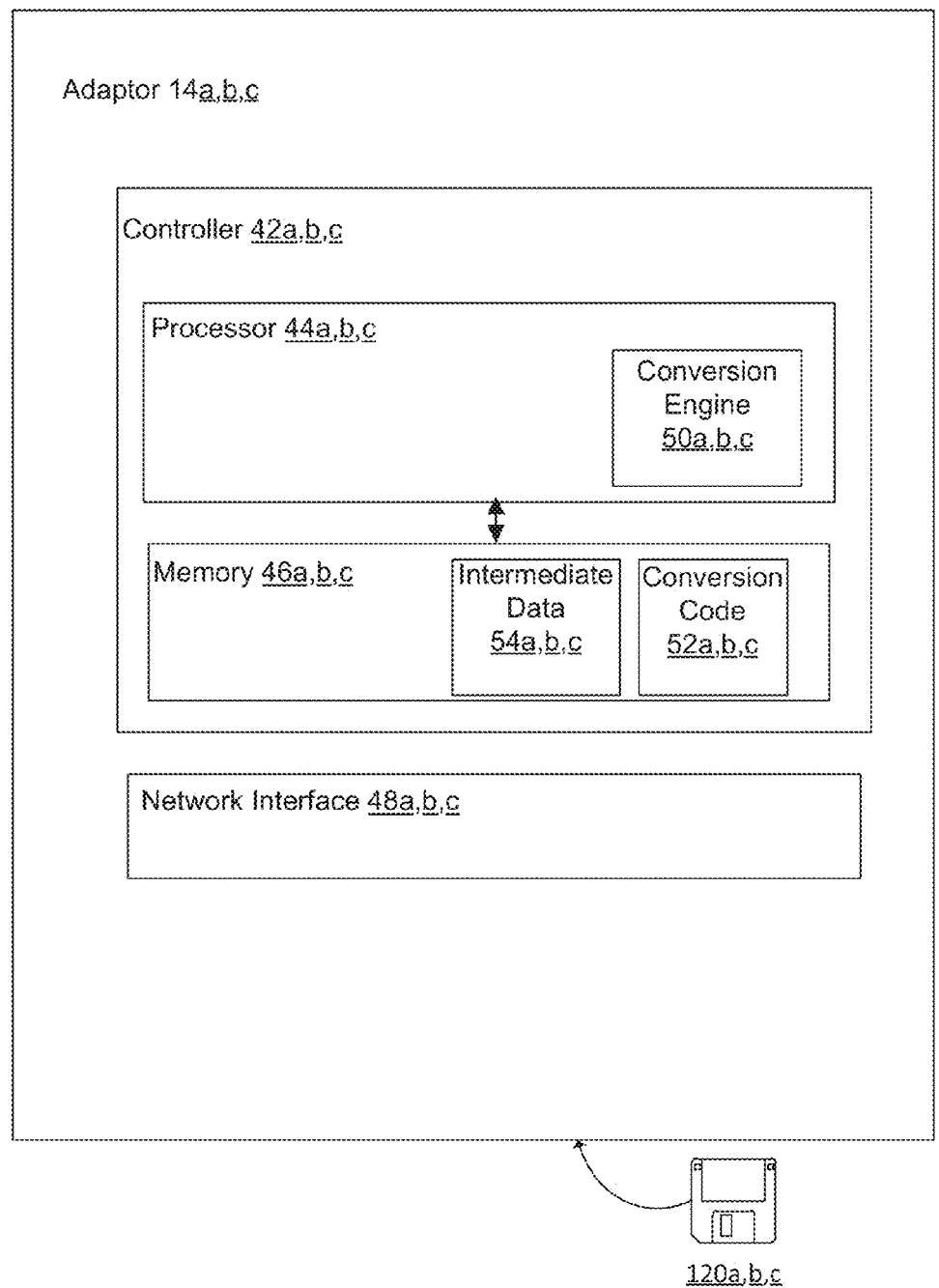
FIG. 2a is a block diagram illustrating an example set of adaptors within the electronic environment shown in FIG. 1.

FIG. 2a illustrates further details of an adaptor 14a as implemented as hardware. Adaptor 14a includes controller 42a, which in turn includes processor 44a and memory 46a, and network interface 48a. Note that in the following discussion, adaptors 14b and 14c have corresponding components and associated numeral labels will be referred to below as "b" and "c", respectively, in place of "a".

Network interface 48a takes the form of an Ethernet card; in some arrangements, network interface 48a takes other forms including a wireless receiver and a token ring card.

Memory 46a is configured to store code which includes conversion code 52a configured to convert facts 36a (see FIG. 1) in a distinct data format with which a fact source is associated to the common data format. Memory 46a also includes space for intermediate data 54a, in which intermediate results of the conversion process are stored. Memory 46a generally takes the form of, e.g., random access memory, flash memory or a non-volatile memory.

Processor 44a takes the form of, but is not limited to, Intel or AMD-based MPUs, and can include a single or multi-cores each running single or multiple threads. Processor 44a is coupled to memory 46a and is configured to execute instructions from conversion code 52a. Processor 44a includes conversion engine 50a.

Conversion engine 50a takes the form of hardware configured to convert the facts 36a to the common data format. In some arrangements, analytics engine 50a takes the form of a separate appliance connected to database server 16.

Figure 2B:
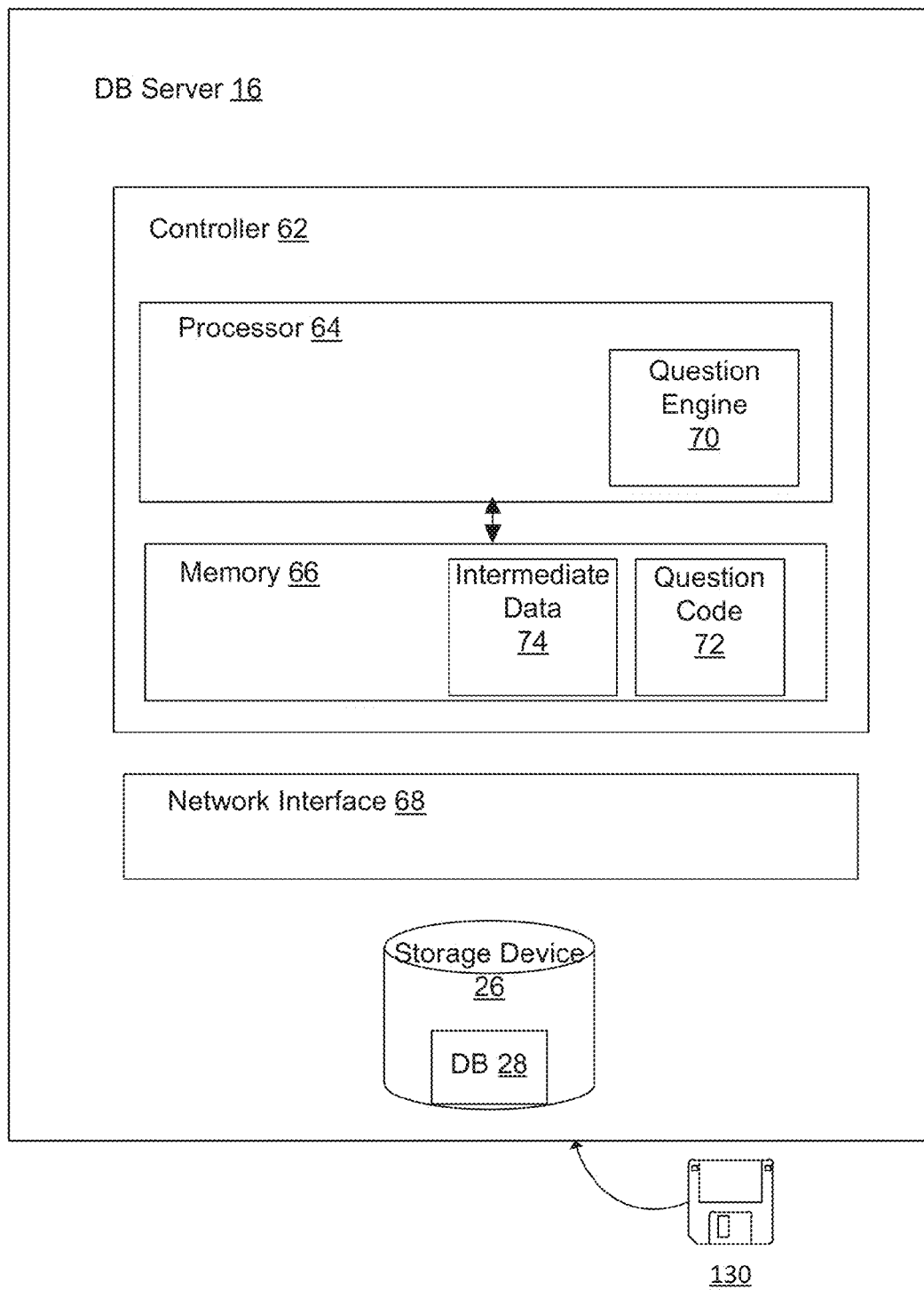
FIG. 2b is a block diagram illustrating an example database server within the electronic environment shown in FIG. 1.

FIG. 2b illustrates further details of database server 16. In addition to storage device 26, database server 16 includes controller 62, which in turn includes processor 64 and memory 66, and network interface 68.

Network interface 68 takes the form of an Ethernet card; in some arrangements, network interface 68 takes other forms including a wireless receiver and a token ring card.

Memory 66 is configured to store code which includes question code 72 configured to generate a set of questions from facts 36 (see FIG. 1) stored in database 28. Memory 66 also includes space for intermediate data 74, in which intermediate results of question building are stored. Memory 66 generally takes the form of, e.g., random access memory, flash memory or a non-volatile memory.

Processor 64 takes the form of, but is not limited to, Intel or AMD-based MPUs, and can include a single or multi-cores each running single or multiple threads. Processor 64 is coupled to memory 66 and is configured to execute instructions from question code 72. Processor 44 includes question engine 70.

Conversion engines 50a, 50b, and 50c take the form of hardware configured to generate a set of questions from facts 36a, 36b, and 36c stored in database 28. In some arrangements, some or all of conversion engines 50a, 50b, and 50c take the form of a separate appliance connected to database server 16.

During operation, network interface 48a receives facts 36a and places data representing facts in space for intermediate data 54a. Upon the space for intermediate data 54a being filled, conversion engine 50a performs a conversion operation on the data representing facts 36a. Analogous events occur with respect to facts 36n and 36c and conversion engines 50b and 50c. Details of the conversion process are described below with respect to FIG. 3.

Figure 3:
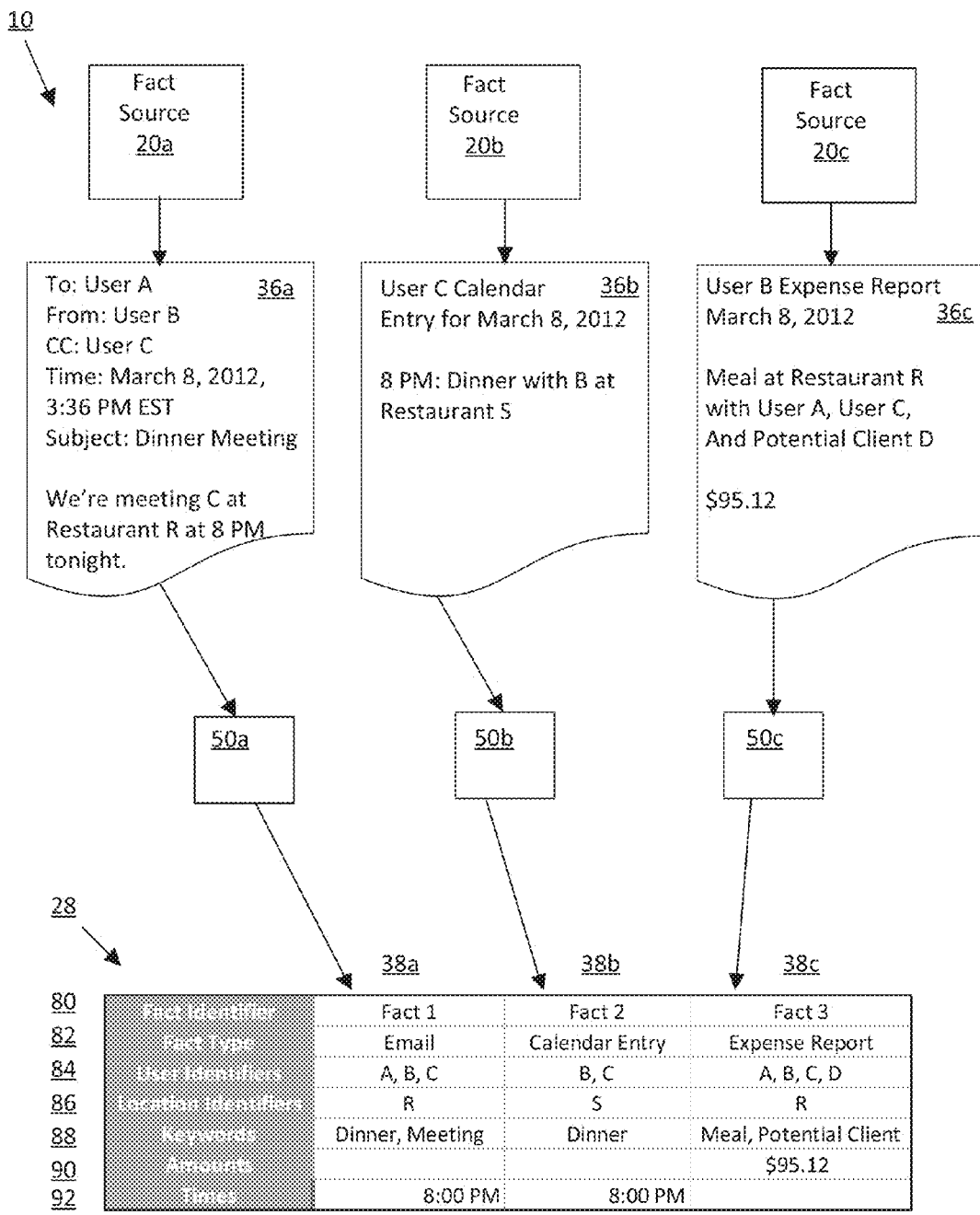
FIG. 3 is a block diagram an example conversion of facts to the common format within the electronic environment shown in FIG. 1.

FIG. 3 illustrates an example conversion operation performed by conversion engines 50a, 50b, and 50c for adaptors 14a, 14b, and 14c. As described with respect to the example provided above, fact source 20a is a Microsoft Exchange® server, fact source 20b is an IBM Lotus Domino® server, and fact source 20c is a SAP server. In these cases, facts 36a are contained in emails, facts 36b are contained in calendar entries, and facts 36c are contained in expense reports.

Along these lines, email 36a is to a user having a user identifier User A from a user having a user identifier User B, cc'ed to a user having user identifier User C, having a subject "Dinner Meeting," received on Mar. 8, 2012. The body of email 36a details a meeting taking place at Restaurant R at 8 PM; because no other keywords (e.g., "tomorrow," "Friday," etc.) are present in the body of email 36a, the meeting is presumably a dinner meeting at 8 PM on Mar. 8, 2012.

Also, calendar entry 36b, belonging to the user having user identifier User C, includes data representing an event including a dinner with the user having user identifier User C at Restaurant S at 8 PM on Mar. 8, 2012.

Further, expense report 36c, belonging to the user having user identifier User B, indicates that a meal was had on Mar. 8, 2012 with users having user identifiers User A and User C at Restaurant R. In addition, a user having identifier Potential Client D was present at the meal. The meal cost $95.12.

Conversion engines 50a, 50b, and 50c each extracts key information from each of the respective facts 36a, 36b, and 36c, and places this information in various fields within corresponding entries within database 28. How each conversion engine 50 places information in database 28 depends on the formatting of the corresponding facts 36. For example, conversion engine 50a extracts the values of the fields in the "To:", "From:", "cc:", "Time:", and "Subject:" lines of email 36a. In addition, conversion engine 50a searches the body of email 36a for various keywords, e.g., "Restaurant R." Conversion engine 50b, on the other hand, extracts the owner (User B), date (March 8), and time (8 PM) of the entry, as well keywords from the description of the event in the entry, e.g., "B" (implying User B) and "Restaurant S." Conversion engine 50c extracts the owner (User C), the event type ("Meal"), a location ("Restaurant B"), and an amount ($95.12), as well as keywords in a description of the expense event, e.g., "Meal," "User A," "User C," and "Potential Client D."

Conversion engines 50a, 50b, and 50c places the respective extracted data into database entries 28a, 28b, and 28c. Each database entry 28a, 28b, and 28c has various fields corresponding to the extracted data: a fact identifier 80, fact type 82, extracted user identifiers 84, extracted location identifiers 86, extracted keywords 88, money amounts 90, and times 92. The data in database 28 represents the facts 36 in a common format; such data is ready to be processed for question building. Details of question building based on data in database 28 are described below with respect to FIG. 4.

Figure 4:
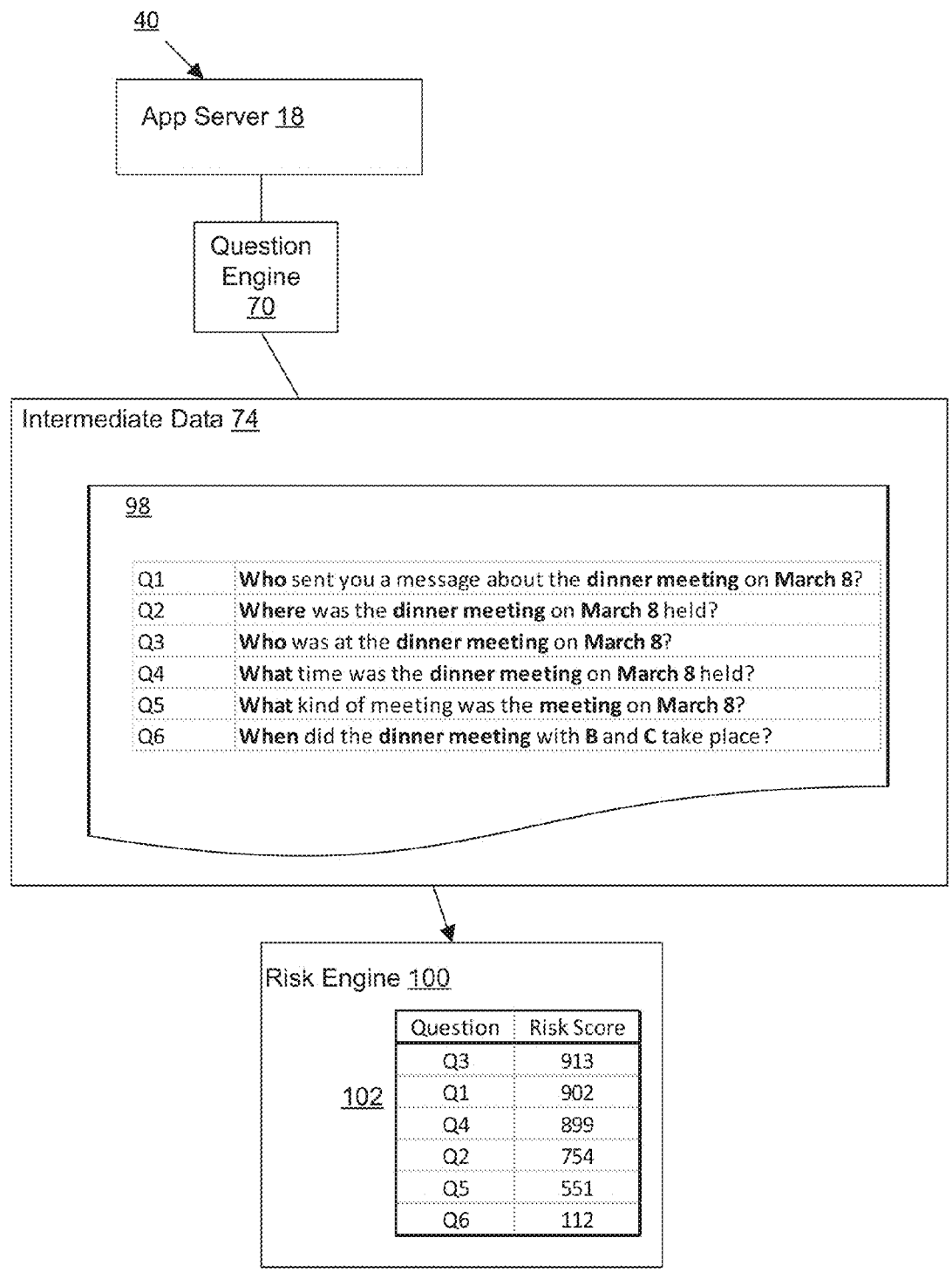
FIG. 4 is a block diagram illustrating an example generation of questions from facts converted to the common format shown in FIG. 3.

FIG. 4 illustrates an example question building operation performed by question building engine 70 (see FIG. 2b) on database 28. In response to receiving a request 40, via application server 18, to authorize user 34 claiming to be User B, question engine 70 performs a lookup operation on database 28 for all entries including a reference to user identifier User B in the extracted user identifiers field 84 (see FIG. 3). (In this case, all entries 28a, 28b, and 28c include such a reference to user identifier User B.) Once the entries that include references to User B have been collected, question building engine 70 begins the question building operation.

Results of a sample question building operation are summarized in the set of questions 98 stored as intermediate data 74 in memory 66 (see FIG. 3). There are six questions (Q1 ... Q6) shown in the set of questions 98; these questions are WH questions (i.e., "who," "what," "when," and "where"). The types of questions are reflective of the sources of the facts 20. For example, "when" questions (e.g., Q6) originate from calendar entry 36b.

In some arrangements, however, facts from each collected entry are cross-checked against the others for consistency. Along these lines, consider the "where" question (Q2) in set of questions 98. Database entries 28a and 28c show that the meeting took place at Restaurant R, while entry 28b has the meeting taking place at Restaurant S. In this case, question engine 70 includes logic (e.g., a rules table) to decide at which location the meeting took place. For example, because the majority of the database entries 28 state that the location was Restaurant R, Restaurant R is taken to be the correct location.

In some further arrangements, set of questions 98 are ranked according to ranking logic provided as part of a risk engine 100 within an adaptive authentication system. Along these lines, User B has a user profile from which risk engine 100 generates a likelihood, in the form of risk scores, of user 34 being User B given a correct response to questions in set of questions 98. The ranking 102 of the questions in set of questions 98 then ensures that questions presented to user 34 have the lowest likelihoods of false positives or false negatives. Questions having a risk score above a threshold risk score may be discarded. In some arrangements, questions having a sufficiently high risk score may be used for training purposes for risk engine 100.

In some further arrangements, question engine 70 may exclude facts involving user identifiers from users outside of an organization. For example, Potential Client D from fact 36c would not be a part of a company employing User A, User B, and User C. In this case, Potential Client D, posing as User B, could gain access to data to which Potential Client D is not authorized to access by answering questions about the meeting in which he participated. In such a case, only question Q1 of set of questions 98 would be presented to user 34.

Figure 5:
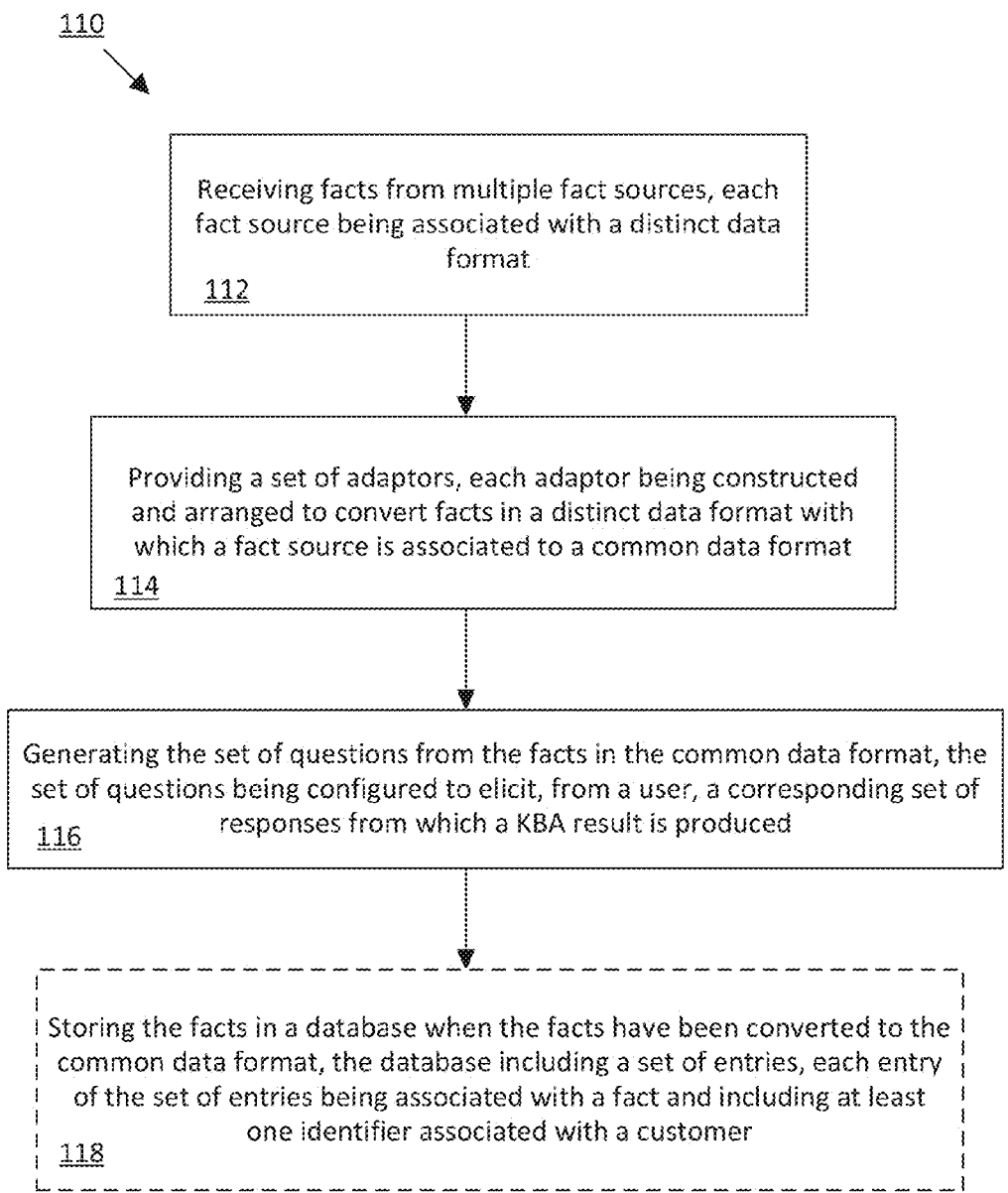
FIG. 5 is a flow chart illustrating a method of carrying out the improved technique within the electronic environment shown in FIG. 1.

FIG. 5 illustrates a method 110 of providing a set of questions in a KBA system. In step 112, facts are received from multiple fact sources, each fact source being associated with a distinct data format. In step 114, a set of adaptors is provided, each adaptor being constructed and arranged to convert facts in a distinct data format with which a fact source is associated to a common data format. In step 116, the set of questions are generated from the facts in the common data format, the set of questions being configured to elicit, from a user, a corresponding set of responses from which a KBA result is produced.

In some arrangements, in step 118, the facts are stored in a database when the facts have been converted to the common data format, the database including a set of entries, each entry of the set of entries being associated with a fact and including at least one identifier associated with a customer.

While various embodiments of the invention have been particularly shown and described, it will be understood by those skilled in the art that various changes in form and details may be made therein without departing from the spirit and scope of the invention as defined by the appended claims.

For example, it should be understood that the improved technique applies to any number of data sources.

Furthermore, it should be understood that some embodiments are directed to KBA system 12 which is, constructed and arranged to provide a set of questions. Some embodiments are directed to a process of providing a set of questions in a KBA system. Also, some embodiments are directed to a computer program product which enables computer logic to provide a set of questions in a KBA system.

In some arrangements, KBA system is implemented by a set of processors or other types of control/processing circuitry running software. In such arrangements, the software instructions can be delivered, within KBA system 12, to adaptors 14a, 14b, and 14c in the form of a computer program product 120a, 120b, and 120c, respectively (see FIG. 2a), as well as to database server 16 in the form of a computer program product 130, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a knowledge-based authentication (KBA) system, a method of providing a set of questions, the method comprising:
   receiving facts from multiple fact sources, each fact source being associated with a distinct data format;
   providing a set of adaptors, each adaptor being constructed and arranged to convert facts in a distinct data format with which a fact source is associated to a common data format; and
   generating the set of questions from the facts in the common data format, the set of questions being configured to elicit, from a user, a corresponding set of responses from which a KBA result is produced;
   wherein the method further comprises:
      storing the facts in a database when the facts have been converted to the common data format, the database including a set of entries, each entry of the set of entries being associated with a fact and including at least one identifier associated with a customer; and
   wherein generating the set of questions from the facts in the common data format includes:
      producing a ranking value associated with a candidate question, the ranking value being indicative of a likelihood that a particular response to the question implies that the user is the customer;
      including the candidate question in the set of questions when the ranking value is greater than a threshold value; and
      excluding the candidate question from the set of questions when the ranking value is less than a threshold value.

2. A method according to claim 1,
   wherein generating the set of questions from the facts in the common data format further includes:
      receiving a request to authenticate the customer; and
      performing a lookup operation on the database in response to the request, the lookup operation being configured to locate entries of the set of entries that include the identifier associated with the customer.

3. A method according to claim 2,
   wherein each fact source is further associated with a fact category of a set of fact categories,
   wherein each entry of the set of entries of the database includes the fact category of the fact source from which the with which the entry is associated was received,
   wherein each question of the set of questions is associated with a question type of a set of question types,
   wherein performing the lookup operation on the database in response to the request includes:
      collecting fact categories of the entries of the set of entries including the identifier associated with the customer, and wherein generating the set of questions from the facts in the common data format further includes:
for each question of the set of questions, selecting a question type of the set of question types based on the collected fact categories.

4. A method according to claim 2,
wherein the customer belongs to an organization;
wherein performing the lookup operation on the database in response to the request further includes:
collecting, from the entries of the set of entries including the user identifier associated with the customer, identifiers associated with other customers;
verifying which of the other customers belong to the organization; and
forming a subset of entries, each entry of the subset of entries having identifiers associated with customers belonging to the organization, and
wherein generating the set of questions from the facts in the common data format further includes:
producing the set of questions from the facts with which the subset of entries is associated.

5. A method as in claim 4,
wherein producing the set of questions from the facts with which the subset of entries is associated includes:
excluding from the set of questions those entries of the set of entries having identifiers associated with customers belonging to a different organization.

6. A method according to claim 1,
wherein a fact source either resides at a remote site or is local to the KBA system, and
wherein providing the set of adaptors includes:
when the fact source resides at a remote site, initiating a conversion of the facts from the fact source at the remote site; and
when the fact source is local to the KBA system, initiating the conversion of the facts from the fact source at the KBA system.

7. A method as in claim 1,
wherein excluding the candidate question from the set of questions when the ranking value is less than the threshold value includes:
placing the candidate question into a training pool of questions, each question from the training pool of questions being used to train a risk engine configured to produce ranking values associated with questions.

8. A knowledge-based authentication (KBA) system constructed and arranged to provide a set of questions, comprising:
a set of adaptors, each adaptor of the set of adaptors including:
a network interface;
memory; and
a controller including controlling circuitry couple to the memory, the controlling circuitry being constructed and arranged to:
receive facts from multiple fact sources, each fact source being associated with a distinct data format; and
convert the facts in a distinct data format with which a fact source is associated to a common data format, and
a database server connected to each adaptor of the set of adaptors, the database server including:
a network interface;
memory; and
a controller including controlling circuitry couple to the memory, the controlling circuitry being constructed and arranged to:
generate the set of questions from the facts in the common data format, the set of questions being configured to elicit, from a user, a corresponding set of responses from which a KBA result is produced;
wherein the database server further includes:
a storage device, and
wherein the controlling circuitry of the database server is further constructed and arranged to:
store the facts in a database stored on the storage device of the database server when the facts have been converted to the common data format, the database including a set of entries, each entry of the set of entries being associated with a fact and including at least one identifier associated with a customer; and
wherein generating the set of questions from the facts in the common data format includes:
producing a ranking value associated with a candidate question, the ranking value being indicative of a likelihood that a particular response to the question implies that the user is the customer;
including the candidate question in the set of questions when the ranking value is greater than a threshold value; and
excluding the candidate question from the set of questions when the ranking value is less than a threshold value.

9. A system according to claim 8,
wherein generating the set of questions from the facts in the common data format further includes:
receiving a request to authenticate the customer; and
performing a lookup operation on the database in response to the request, the lookup operation being configured to locate entries of the set of entries that include the identifier associated with the customer.

10. A system according to claim 9,
wherein each fact source is further associated with a fact category of a set of fact categories,
wherein each entry of the set of entries of the database includes the fact category of the fact source from which the with which the entry is associated was received,
wherein each question of the set of questions is associated with a question type of a set of question types,
wherein performing the lookup operation on the database in response to the request includes:
collecting fact categories of the entries of the set of entries including the identifier associated with the customer, and
wherein generating the set of questions from the facts in the common data format further includes:
for each question of the set of questions, selecting a question type of the set of question types based on the collected fact categories.

11. A system according to claim 9,
wherein the customer belongs to an organization;
wherein performing the lookup operation on the database in response to the request further includes:
collecting, from the entries of the set of entries including the user identifier associated with the customer, identifiers associated with other customers;
verifying which of the other customers belong to the organization; and forming a subset of entries, each entry of the subset of entries having identifiers associated with customers belonging to the organization, and wherein generating the set of questions from the facts in the common data format further includes:

producing the set of questions from the facts with which the subset of entries is associated.

12. A system according to claim 8, wherein a fact source either resides at a remote site or is local to the KBA system, and wherein converting the facts in the distinct data format with which the fact source is associated to the common data format includes:

when the fact source resides at a remote site, initiating a conversion of the facts from the fact source at the remote site; and when the fact source is local to the KBA system, initiating the conversion of the facts from the fact source at the KBA system.

13. A computer program product having a non-transitory, computer-readable storage medium which stores code to provide a set of questions in a knowledge-based authentication (KBA) system, the code including instructions to:

receive facts from multiple fact sources, each fact source being associated with a distinct data format;

provide a set of adaptors, each adaptor being constructed and arranged to convert facts in a distinct data format with which a fact source is associated to a common data format; and generate the set of questions from the facts in the common data format, the set of questions being configured to elicit, from a user, a corresponding set of responses from which a KBA result is produced;

wherein the code includes further instructions to:

store the facts in a database when the facts have been converted to the common data format, the database including a set of entries, each entry of the set of entries being associated with a fact and including at least one identifier associated with a customer; and wherein generating the set of questions from the facts in the common data format includes:

producing a ranking value associated with a candidate question, the ranking value being indicative of a likelihood that a particular response to the question implies that the user is the customer;

including the candidate question in the set of questions when the ranking value is greater than a threshold value; and excluding the candidate question from the set of questions when the ranking value is less than a threshold value.

14. A computer program product according to claim 13, wherein generating the set of questions from the facts in the common data format further includes:

receiving a request to authenticate the customer; and performing a lookup operation on the database in response to the request, the lookup operation being configured to locate entries of the set of entries that include the identifier associated with the customer.

15. A computer program product according to claim 14, wherein each fact source is further associated with a fact category of a set of fact categories, wherein each entry of the set of entries of the database includes the fact category of the fact source from which the with which the entry is associated was received, wherein each question of the set of questions is associated with a question type of a set of question types, wherein performing the lookup operation on the database in response to the request includes:

collecting fact categories of the entries of the set of entries including the identifier associated with the customer, and wherein generating the set of questions from the facts in the common data format further includes:

for each question of the set of questions, selecting a question type of the set of question types based on the collected fact categories.

16. A computer program product according to claim 14, wherein the customer belongs to an organization;

wherein performing the lookup operation on the database in response to the request further includes:

collecting, from the entries of the set of entries including the user identifier associated with the customer, identifiers associated with other customers;

verifying which of the other customers belong to the organization; and forming a subset of entries, each entry of the subset of entries having identifiers associated with customers belonging to the organization, and wherein generating the set of questions from the facts in the common data format further includes:

producing the set of questions from the facts with which the subset of entries is associated.

\* \* \* \* \*